United States Patent [19]

Okada et al.

[11] Patent Number: 5,368,150
[45] Date of Patent: Nov. 29, 1994

[54] PALLET EXCHANGE APPARATUS

[75] Inventors: Yasuhiro Okada, Nagoya; Yukio Hoshino, Gamagori; Yasuhiro Hattori, Nagoya; Hidekazu Hirano, Chiryu, all of Japan

[73] Assignee: Toyoda Koki Kabushiki Kaisha, Kariya, Japan

[21] Appl. No.: 74,582

[22] Filed: Jun. 11, 1993

[30] Foreign Application Priority Data

Jun. 12, 1992 [JP] Japan ................... 4-177686

[51] Int. Cl.$^5$ ............................................ B65G 37/00
[52] U.S. Cl. .................. 198/346.1; 198/378; 29/33 P
[58] Field of Search ............ 198/346.1, 346.2, 375, 198/378, 341; 29/33 P, 563; 414/222

[56] References Cited

U.S. PATENT DOCUMENTS

| 1,833,417 | 11/1931 | Drake | 198/378 |
| 4,318,465 | 3/1982 | Calvert et al. | 198/341 |
| 4,564,101 | 1/1986 | Nagel | 198/346.2 |
| 4,797,052 | 1/1989 | Ohta et al. | 198/346.1 |
| 4,934,031 | 6/1990 | Maeda et al. | 198/346.1 |
| 5,099,980 | 3/1992 | Babel | 198/346.1 |

FOREIGN PATENT DOCUMENTS

| 61-37479 | 10/1986 | Japan . | |
| 253335 | 4/1990 | Japan . | |
| 3149153 | 6/1991 | Japan | 198/346.1 |

Primary Examiner—Joseph E. Valenza
Attorney, Agent, or Firm—Oblon, Spivak, McClelland, Maier & Neustadt

[57] ABSTRACT

A pallet exchange apparatus has a bed and an arm assembly supported on the bed to be rotatable between a workpiece loading-and-unloading station and workpiece machining station. A pair of cylindrical holes are formed at both ends of the arm assembly for receiving the pallets. The apparatus is further provided with driving means for rotating the arm assembly, a turntable rotatably mounted on the bed at a position corresponding to the workpiece machining station, first engagement portions formed at the ends of the arm assembly, second engagement portions formed on the pallets so as to be engaged with the first engagement portions for preventing the rotation of the pallets, and a moving device disposed on the turntable for moving the pallet located at the workpiece machining station in the vertical direction. When the pallet is lowered by the moving device, the pallet is separated from the turntable and the second engagement portion of the pallet is engaged with the first engagement portion. When the pallet is raised, the pallet is thrust against the turntable and the second engagement portion is disengaged from the second engagement portion.

6 Claims, 6 Drawing Sheets

FIG. 7

PALLET EXCHANGE APPARATUS

BACKGROUND OF THE INVENTION

1. Field of the Invention

The present invention relates to a pallet exchange apparatus for exchanging pallets on which workpieces are mounted, between a workpiece loading-and-unloading station and a workpiece machining station of a machine tool.

2. Prior Art of the Invention

Figure 1:
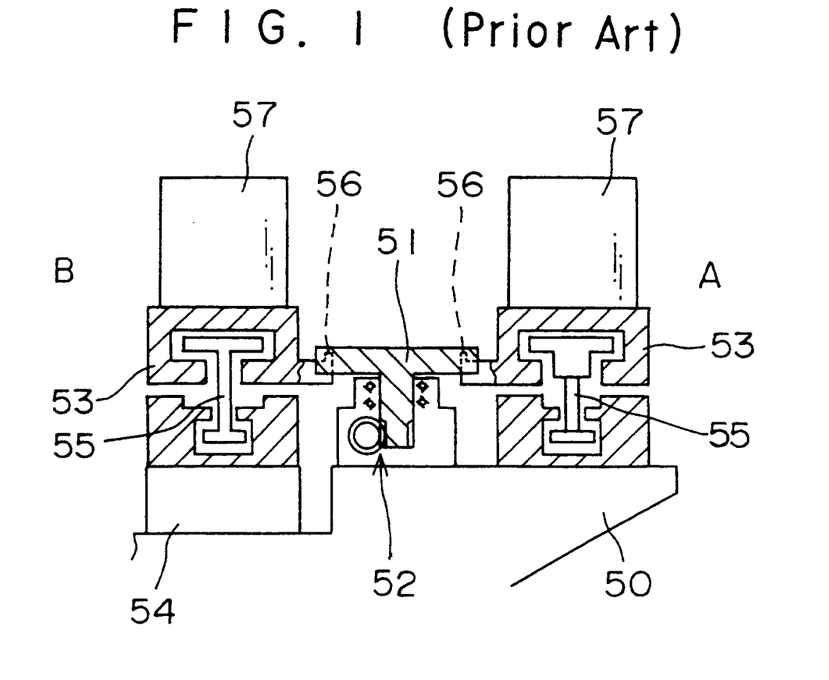
FIG. 1 is a sectional view of a pallet exchange apparatus according to the prior art.

Referring to FIG. 1, in a conventional pallet exchange apparatus, an arm 51 is supported by a bed 50 through a drive shaft to be horizontally rotated by a rack-and-pinion mechanism 52. The rack-and-pinion mechanism 52 is arranged at the lower end of the drive shaft of the arm 51 and operated by a hydraulic cylinder. The arm 51 is arranged between a workpiece loading-and-unloading station A and a workpiece machining station B at which pallets 53 are located. Workpieces are fixed to the pallets 53 by the use of jigs 57. Upon the completion of machining of a workpiece, the pallets 53 are raised by cylinder devices 55 to be engaged with both ends of the arm 51 through hook portions 56 of the pallets 56. The arm 51 is rotated by 180 degrees and the pallets 53 are also rotated therewith along arcuate guide rails, which are not shown. In such a way, the pallets 53 are exchanged between the workpiece loading-and-unloading station A and the workpiece machining station B. After the exchanging operation, the pallets 53 are lowered by the cylinder device 55 and disengaged from the arm 51. Then, the pallet 53 at the workpiece machining station B is rotated on a turntable 54 mounted on the bed 1 by a predetermined angle.

Figure 2:
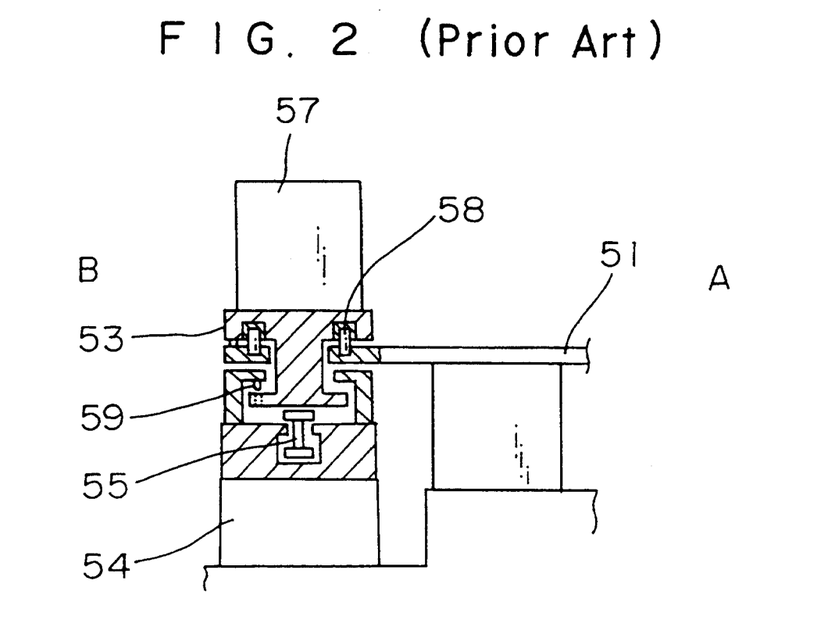
FIG. 2 is a sectional view of another pallet exchange apparatus according to the prior art.

Another pallet exchange apparatus is illustrated in FIG. 2. After the machining operation, the pallet 53 at the workpiece machining station B is lowered by the cylinder device 55 to be engaged with the arm 51 through first knock pins 58 formed on the arm 51. The arm 51 is then rotated by 180 degrees so as to exchange the pallet 53 with another pallet 53. After that, the pallet 53 at the workpiece machining station B is raised by the cylinder devices 55 so that the first knock pins 58 are pulled out from the pallet 53. At the same time, the pallet 53 is engaged with the turntable 54 through second knock pins 59 which are attached to the turntable 54.

In both pallet exchange apparatuses, the jigs 57 are disposed on the pallets 53 for clamping the workpieces. Since the pallets 53 are not securely held by the arm 51, when the arm 51 is rotated at a high speed, the jigs 57 become unstable due to the centrifugal force and inertia force generated during the acceleration and deceleration of the arm 51. In case where the hooks 56 and the first knock pins 58 in the apparatuses shown in FIGS. 1 and 2, respectively, are extended in the vertical direction to solve the problem, ascend-and-descend stroke of the pallets 53 becomes large and the time required for exchanging pallets 53 also becomes long.

In the pallet exchange apparatus shown in FIG. 1, there is another problem that the pallets 53 make a noise when the pallets 53 move along the arcuate guide rails. Consequently, it is difficult to move the pallets 53 at a high speed, whereby there is a limit to shorten the machining cycle time.

SUMMARY OF THE INVENTION

It is therefore an object of the present invention to provide an improved pallet exchange apparatus wherein pallets are stably supported by an arm of the pallet exchange apparatus so that the arm can be rotated at a high speed.

Another object of the present invention is to provide an improved pallet exchange apparatus which has a simple and compact construction compared with conventional apparatuses.

A pallet exchange apparatus of the present invention for exchanging pallets between a workpiece loading-and-unloading station and a workpiece machining station of a machine tool has a bed and an arm assembly supported on the bed to be horizontally rotatable. The arm assembly has two ends extending to the workpiece loading-and-unloading station and workpiece machining station. A pair of cylindrical holes are formed at the ends, respectively for receiving the pallets. The apparatus is further provided with driving means for rotating the arm assembly so as to move the ends of the arm assembly between the workpiece loading-and-unloading station and workpiece machining station, a turntable rotatably mounted on the bed at a position corresponding to the workpiece machining station, first engagement portions formed at the ends of the arm assembly, second engagement portions formed on the pallets so as to be engaged with the first engagement portions for preventing the rotation of the pallets, and a moving device which is disposed on the turntable for moving the pallet located at the workpiece machining station in the vertical direction between a first position and a second position. When the pallet is located at the first position, the pallet is separated from the turntable and the second engagement portion of the pallet is engaged with the first engagement portion at one end of the arm assembly. When the pallet is located at the second position, the pallet is thrust against the turntable and the second engagement portion is disengaged from the first engagement portion.

With this configuration, the pallets are stably supported by the arm assembly. The jigs mounted on the pallets also become stable in spite of the centrifugal force and inertia force generated during acceleration and deceleration. The arm assembly can be rotated at a high speed. It is thus possible to shorten the machining cycle time and raise the machining efficiency.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiment when considered in connection with the accompanying drawings, in which.

DETAILED DESCRIPTION OF PREFERRED EMBODIMENTS

Figure 3:
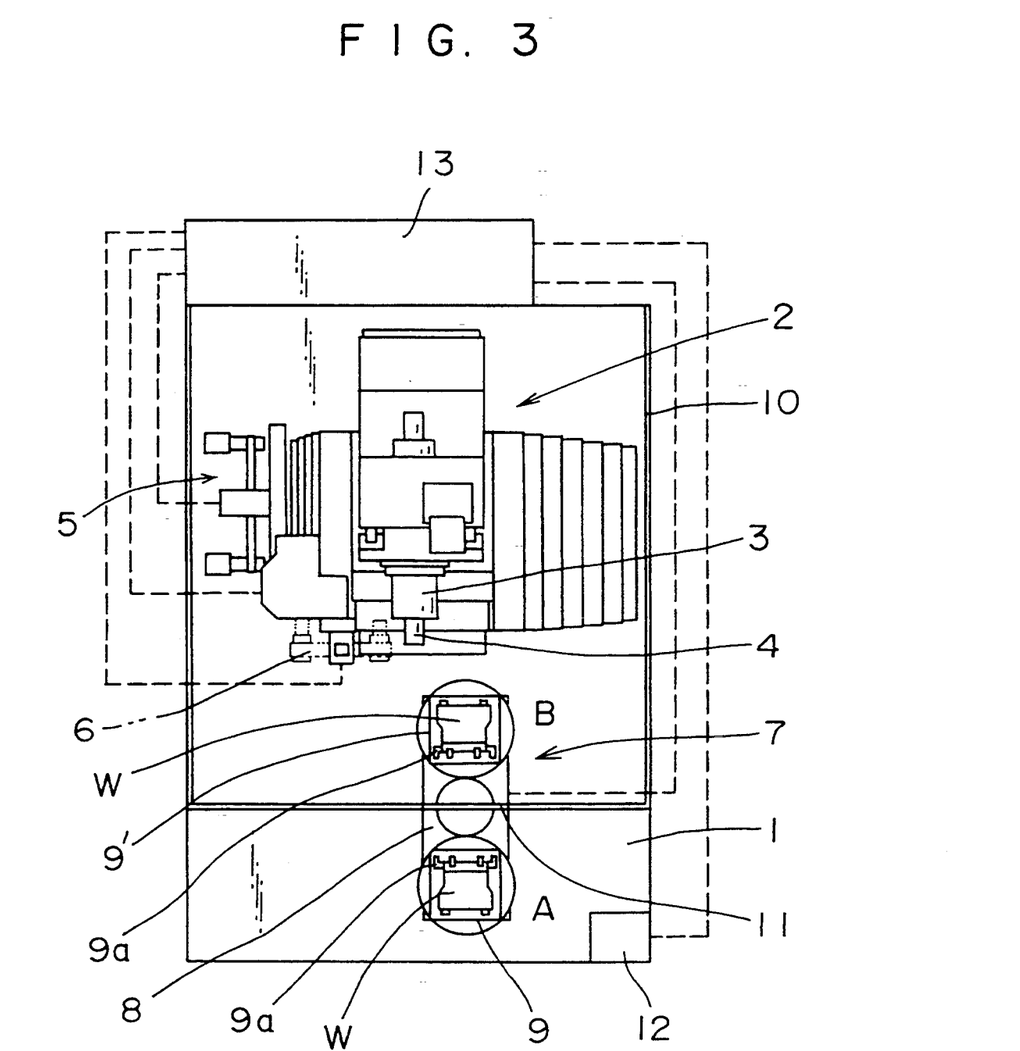
FIG. 3 is a plan view of a numerical controlled machine tool which adopts a pallet exchange apparatus according to the present invention.

A preferred embodiment of the present invention will be described by referring to the drawings. FIG. 3 shows a numerical controlled special purpose machine tool in which a pallet exchange apparatus 7 of the present invention is arranged. In FIG. 3, reference numbers 1 and 2 represent a bed and a machining unit mounted on the bed 1, respectively. The machining unit 2 comprises a spindle head 3 movable in three dimensions, a tool magazine 5 in which a plurality of tools are stored, and a tool changer 6 for automatically changing the tools between the tool magazine 5 and a main spindle 4 of the spindle head 3.

A pallet exchange apparatus 7 is disposed in front of the spindle head 3. In the pallet exchange apparatus 7, two pallets 9 and 9' are arranged at the opposite positions with respect to a rotational axis of an arm 8. On the pallets 9 and 9', workpieces W are clamped by jigs 9a. When the arm 8 is rotated by 180 degrees, the pallets 9 and 9' are moved between a workpiece loading-and-unloading station A and a workpiece machining station B.

The machining unit 2 and the pallet 9' positioned at the machining station B are enclosed with a cover 10. The cover 10 has a opening (not shown) at a position corresponding to the pallet exchange apparatus 7. A rotary shutter 11 is stood on the arm 8 at the center in the longitudinal direction of the arm 8, and the opening is closed by the rotary shutter 11 when the arm 8 is stopped.

An operation panel 12 is disposed near the pallet exchange apparatus 7. A controller 13 is disposed behind the machining unit 2, being out of the cover 10. The machining unit 2, tool magazine 5, tool changer 6 and pallet exchange apparatus 7 are controlled by the controller 13 in response to commands input through the operation panel 12.

The construction of the pallet exchange apparatus 7 will be explained with reference to FIGS. 4 through 8. In FIGS. 5 and 7, there is shown an arm supporting table 20 fixed on a bed 1. A motor 21 is fixed to an attachment member 38, and the attachment member 38 is attached to the arm supporting table 20 with a plurality of bolts 38a. An output shaft of the motor 21 extends in the vertical direction. A connecting shaft 14 having a gear integrally formed at its upper end is connected to the output shaft of the motor 21 through a coupling, and the upper end of the connecting shaft 14 is inserted into a reduction gear device 22 to be engaged with an input gear (not shown) of the reduction gear device 22. In this embodiment, a RV reduction gear, model No. RV-135-AII-81 (trade name, product of Teijin Seiki, Co. LTD.), is used as the reduction gear device 22. A rotatable casing of the reduction gear device 22, that is an output member, is coupled with the arm 8. The body of the reduction gear device 22 is fixed to the arm supporting table 20.

Figure 4:
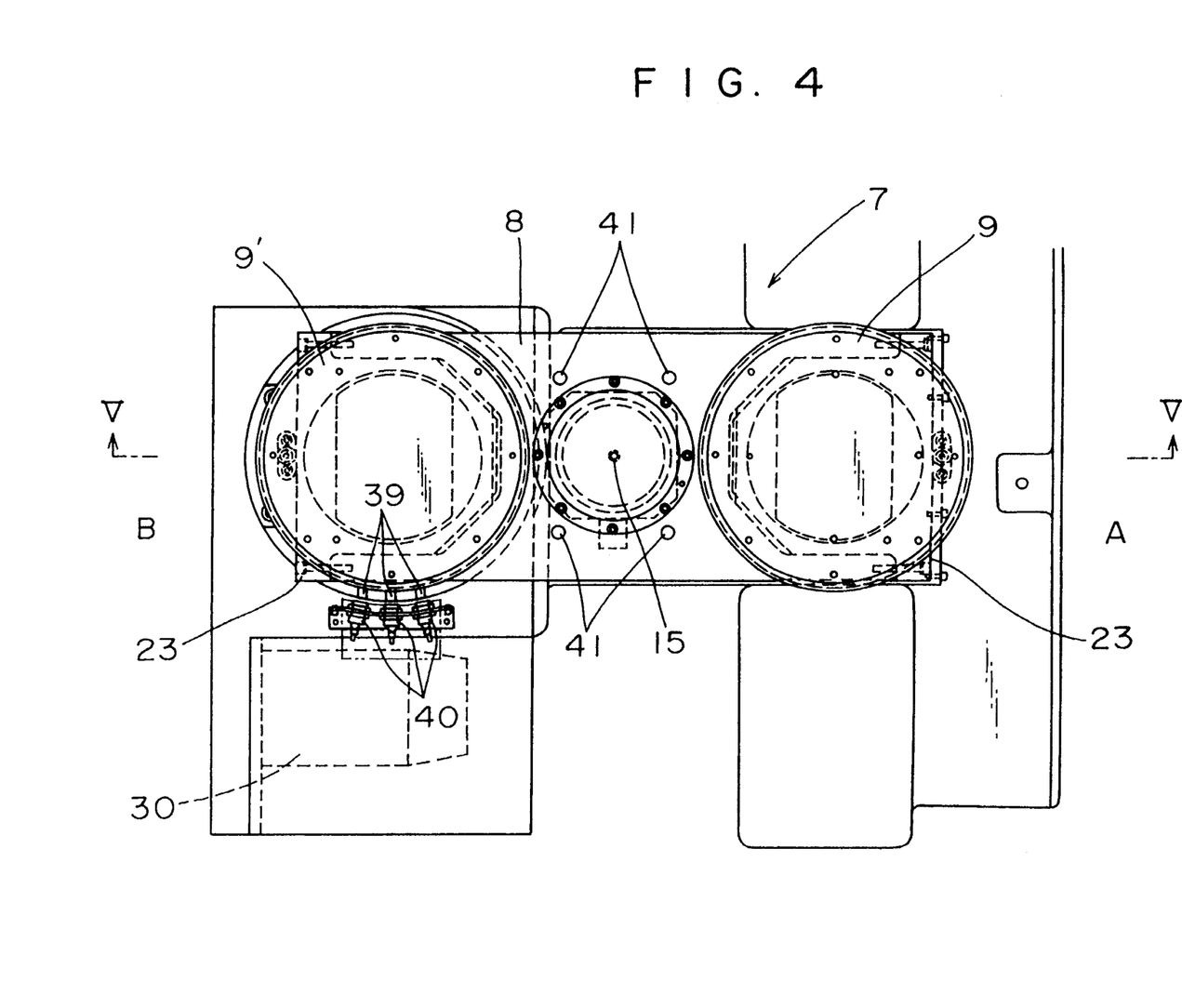
FIG. 4 is a plan view of the pallet exchange apparatus according to the present invention.
Figure 5:
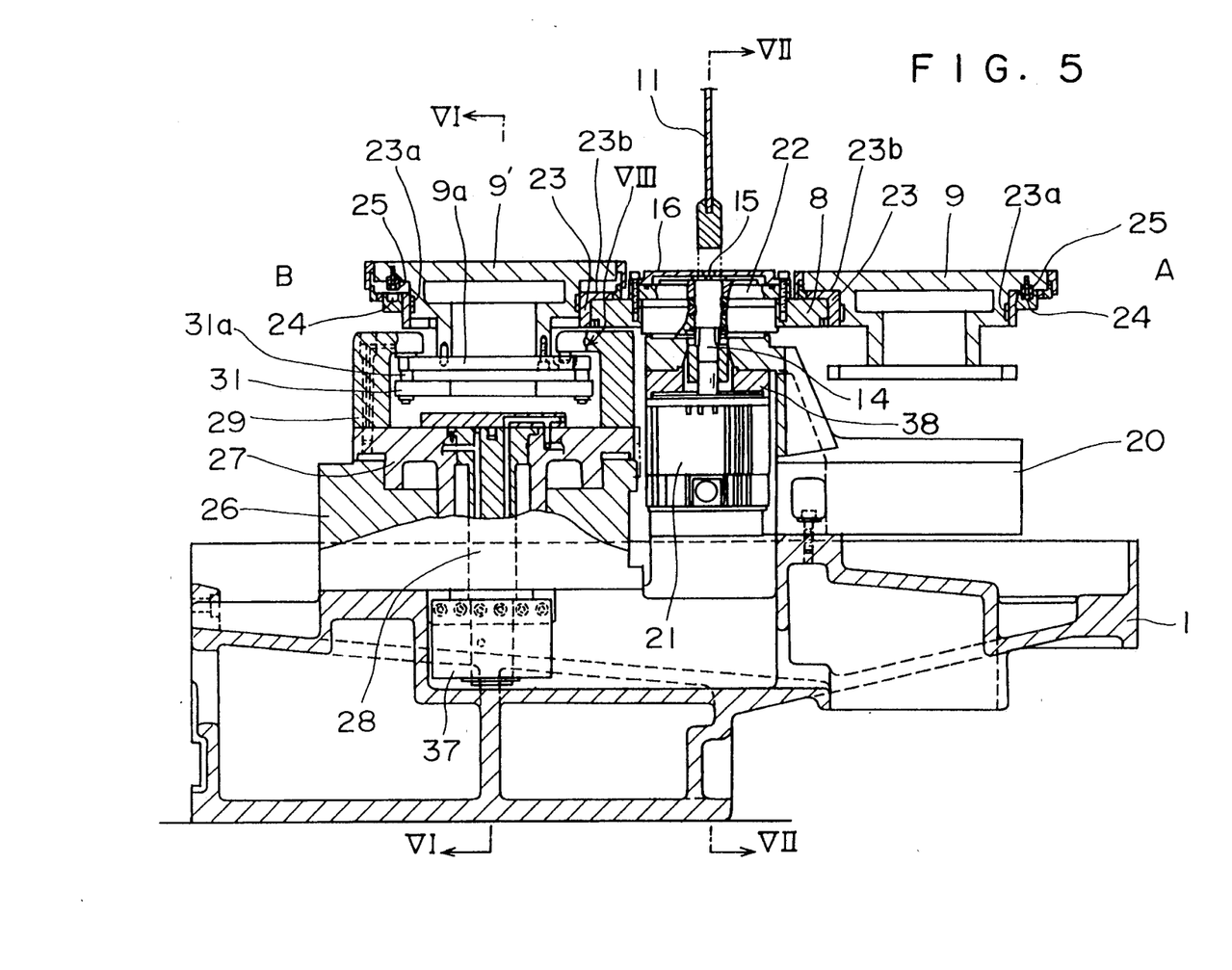
FIG. 5 is a sectional view taken along line V—V of FIG. 4.
Figure 6:
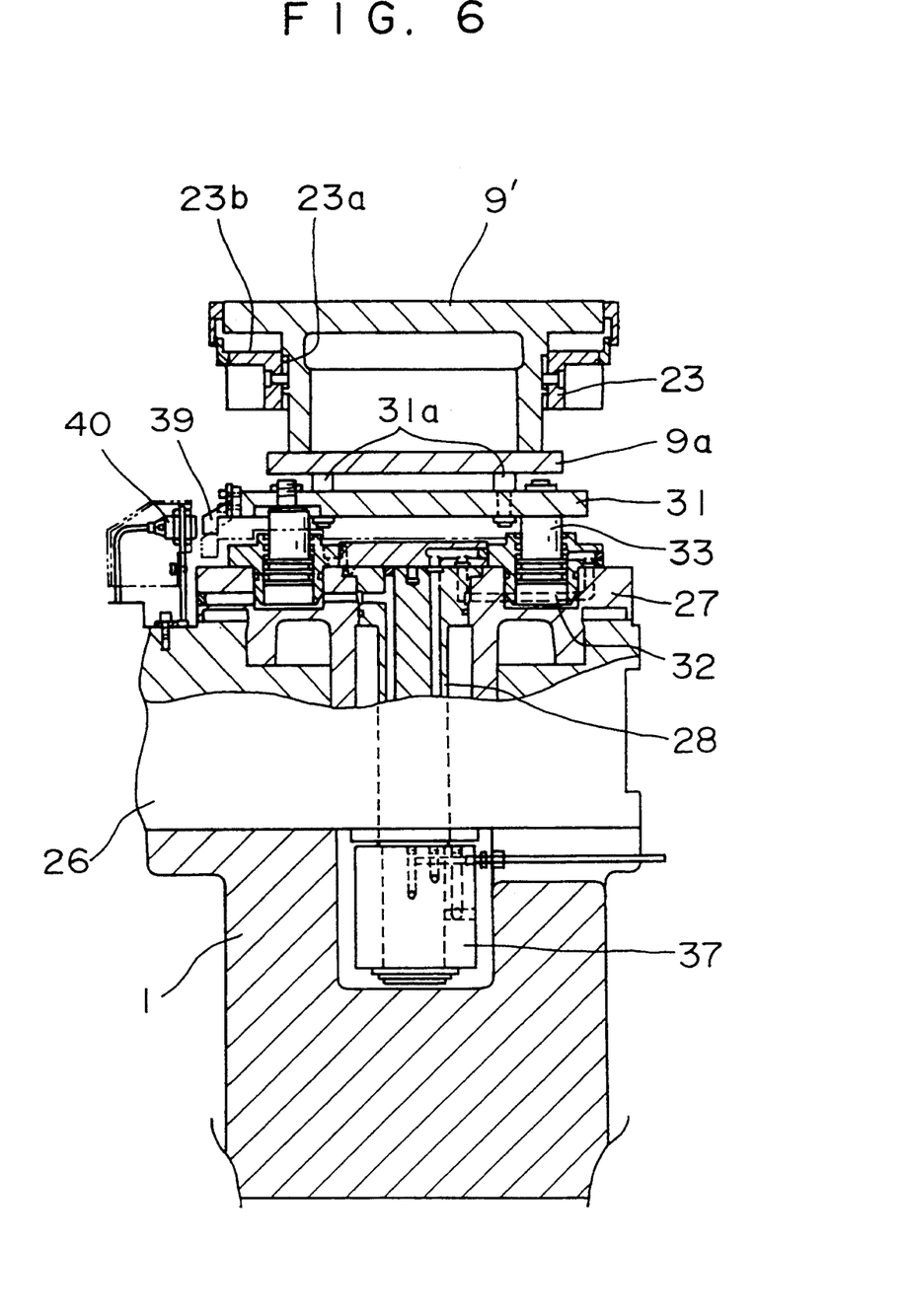
FIG. 6 is a sectional view taken along line VI—VI of FIG. 5.
Figure 7:
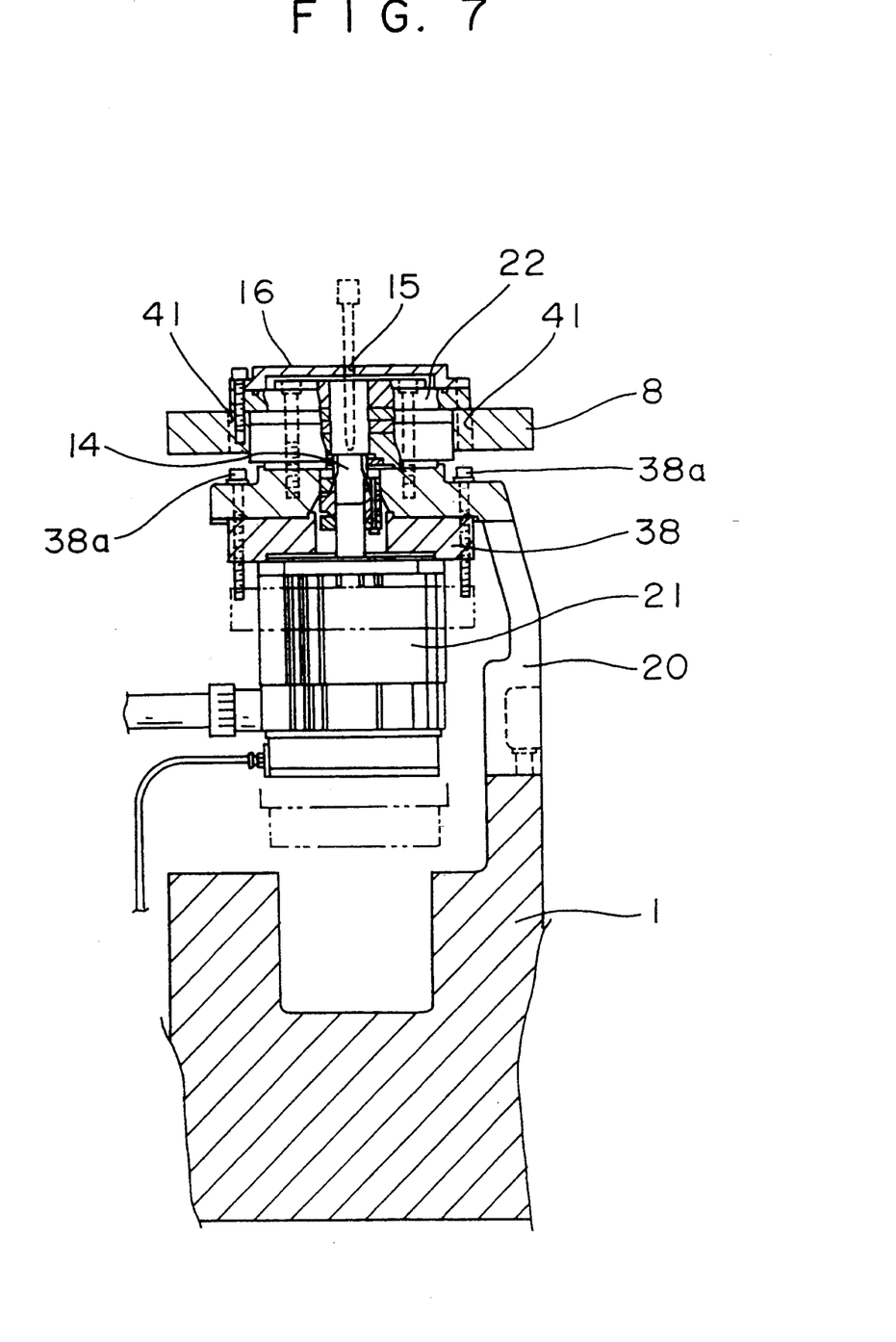
FIG. 7 is a sectional view taken along line VII—VII of FIG. 5.

The arm 8 is provided with pallet holding members 23 at both ends thereof, as shown in FIGS. 4 through 6. Each of the pallet holding members 23 has a cylindrical guide surface 23a whose center axis is parallel to the rotational axis of the arm 8 and a circular support surface 23b perpendicular to the guide surface 23a. The arm 8 and the pallet holding members 23 constitute an arm assembly. The pallets 9 and 9' are fitted into the guide surfaces 23a of the pallet holding members 23 to be movable in the vertical direction and rotatable. A first knock pin 25 protrudes from a bottom surface of an upper end portion of each pallet 9 and 9'. In response to descent of the pallets 9 and 9', the first knock pins 25 are engaged with corresponding pin holes 24 which are formed in the support surfaces 23b of the pallet holding members 23. Incidentally, the first knock pins 25 may protrude from the pallet holding members 23, while the first pin holes 24 may be formed in the pallets 9 and 9'. In case where the pallets 9 and 9' are directly held by the arm 8, the first knock pins 25 may be formed on the arm 8, while the first pin holes 24 may be formed in the pallets 9 and 9'.

At the workpiece machining station B, a supporting table 26 is fixed to the bed 1. A turntable 27 is horizontally rotatably supported on the supporting table 26 via a rotational shaft 28 which is rotated about the same axis as the pallet 9' located at the workpiece machining station B. The rotational shaft 28 is rotated by a turntable motor 30 through a rotation transmitting mechanism (not shown) having a pulley and belt, so that the turntable 27 is indexed to a predetermined angular position.

Figure 8:
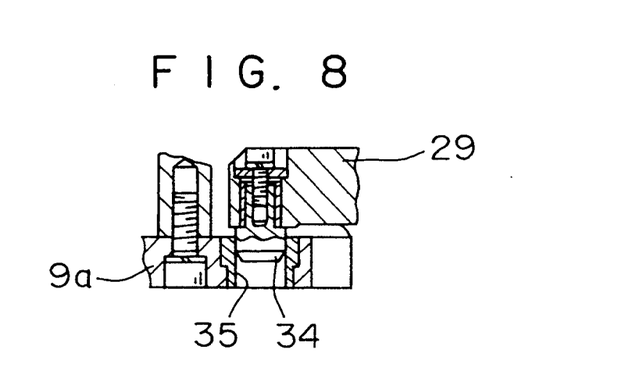
FIG. 8 is an enlarged view of the portion indicated by arrow VIII of FIG. 5.

Between the pallet 9' and the turntable 27, a pallet moving device is arranged to move the pallet 9 in the vertical direction. As illustrated In FIGS. 5 and 6, the pallet moving device comprises a pair of cylinders 32 formed in the turntable 27 in the parallel relationship with the rotational shaft 28 of the turntable 27, pistons 33 received in the cylinders 32, and a plate 31 connected to the upper ends of the pistons 33. The plate 31 is provided with plural engagement members 31a engagable with a lower member 9a of the pallet 9'. The cylinders 32 are supplied with pressurized fluid passing through a distributor 37. Support members 29 are attached to the turntable 27 so as to face the side surfaces of the plate 31 and the lower member 9a of the pallet 9'. Each of the support members 29 is provided at its upper end with an engagement portion extending inwardly, which faces and the upper end surface of the lower member 9a of the pallet 9'. FIG. 8 shows an enlarged view of the portion indicated by arrow VIII of FIG. 5. A second pin hole 35 is formed in the upper end surface of the lower member 9a of the pallet 9', and a second knock pin 34 protrudes from the bottom end surface of the support member 29 so as to face the second pin hole 35. In response to ascent of the pallet 9', the second knock pin 34 is engaged with the second pin hole 35.

Referring to FIG. 6, plural blocks 39 are fixed to the peripheral surface of the plate 31. The turntable 26 is provided with plural sensors 40 facing the blocks 39. The conditions between the pallet 9' and turntable 27, that is a clamped condition, unclamped condition and overstrike movement, are detected by using the blocks 39 and sensors 40.

The arm 8 is provided with holes 41 corresponding to the horizontal positions of the bolts 38a for fixing the motor 21, as illustrated in FIG. 4. Ordinarily, plugs are inserted into the holes 41. At changing the motor 21, an operator removes the plugs and inserts a tool such as wrench into the holes 41 for loosing the bolts 38a so that the attachment member 38 and the motor 21 are moved down and the bolts 38a are finally disengaged from the attachment member 38. With this operation, the connecting shaft 14 is pulled out from the reduction gear device 22, and the motor 21 is then removed from the attachment member 38. A new motor 21, to which the connecting shaft 14 has been attached in advance, is then attached to the attachment member 38. After that, the attachment member 38 is attached to the arm supporting table 20. A torque wrench is inserted into the upper portion of the reduction gear device 22 through a hole 15 of a cover 16, and engaged with the connecting shaft 14, as shown in FIG. 7. The torque wrench is then rotated to match the gear of the connecting shaft 14 with the input gear of the reduction gear device 22 in their phases, while inserting the connecting shaft 14 into the reduction gear device 22.

The operation of the present invention will be explained hereinafter. FIG. 5 shows a condition wherein the pallet 9' at the workpiece machining station B is clamped to the turntable 27. Since it is necessary to unclamp the pallet 9' positioned at the workpiece machining station B for exchanging the pallets 9 and 9', the pistons 33 of the pallet moving device are lowered, whereby the plate 31 is lowered therewith. With this operation, the pallet 9' is separated apart from the support member 29. The second knock pin 34 formed on the support member 29 comes off from the second pin hole 35 formed in the upper end surface of the lower member 9a of the pallet 9'. At the same time, the first knock pins 25 are engaged with the first pin holes 24 so that the pallets 9 and 9' are prevented from rotating with respect to the arm 8.

When the arm 8 is rotated by 180 degrees under such condition that the pallet 9' is unclamped, the pallets 9 and 9' are exchanged between the workpiece loading-and-unloading station A and workpiece machining station B. The pallets 9 and 9' are stably supported by the support surfaces 23b and guide surfaces 23a of the pallet holding members 23 having a large area. Consequently, the jigs attached to the pallets 9 and 9' are stable in spite of the centrifugal force and inertia force generated during acceleration and deceleration. It is thus possible to rotate the arm 8 at a high speed.

After completion of exchanging the pallets 9 and 9', the clamping operation for the pallet 9' positioned at the workpiece machining station B is carried out. The clamping operation is contrary to the unclamping operation. Namely, the plate 31 is raised as the pistons 33 are moved upward. The second knock pin 34 is fitted to the second pin hole 35 formed in the support member 29. As the same time, the first knock pin 25 formed on the pallet 9' is disengaged from the second pin hole 24, whereby the pallet 9' is allowed to rotate with respect to the arm 8.

The sensors 40 detect the unclamp and clamp conditions. Further, under such condition that the pallet 9' is clamped to the turntable 27, the turntable 27 is rotated by the motor 30. Accordingly, the pallet 9' at the workpiece machining station B can be indexed to a predetermined angular position.

Obviously, numerous modifications and variations of the present invention are possible in light of the above teachings. It is therefore to be understood that within the scope of the appended claims, the present invention may be practiced otherwise than as specifically described herein.

What is claimed is:

1. A pallet exchange apparatus for exchanging pallets between a workpiece loading-and-unloading station and a workpiece machining station of a machine tool comprising:
   a bed;
   an arm assembly supported on said bed to be horizontally rotatable, said arm assembly having two ends extending to the workpiece loading-and-unloading station and workpiece machining station, and a pair of pallet holding members being formed at said ends, respectively for receiving said pallets, said pallet holding member comprising a cylindrical guide surface and a circular support surface;
   a driving unit for rotating said arm assembly so as to move said ends of said arm assembly between the workpiece loading-and-unloading station and workpiece machining station;
   a turntable rotatably mounted on said bed at a position corresponding to the workpiece machining station;
   first engagement portions formed at said ends of said arm assembly;
   second engagement portions formed on said pallets so as to be engaged with said first engagement portions for preventing the rotation of said pallets; and
   a moving device which is disposed on said turntable for moving said pallet located at the workpiece machining station in the vertical direction between a first position and a second position, wherein said pallet is separated from said turntable and the second engagement portion of said pallet is engaged with the first engagement portion at one end of said arm assembly, and is stably supported by said guide surface and said support surface, when said pallet is located at the first position, while said pallet is thrust against said turntable and the second engagement portion is disengaged from the first engagement portion when said pallet is located at the second position.

2. A pallet exchange apparatus according to claim 1, wherein said pallets are provided with brim portions at their bottom ends, and said turntable has a support member with an abutment portion which faces an upper surface of the brim portion of said pallet located at the workpiece machining station; said apparatus further comprises a third engagement portion formed on a lower surface of the abutment portion of said support member, fourth engagement portions formed on upper surfaces of the brim portions of said pallets so as to be engaged with said third engagement portion; and wherein the brim portion of said pallet located at the workpiece machining station is separated from the abutment portion and the third engagement portion is disengaged from the fourth engagement portion when said pallet is located at the first position, while the brim portion of said pallet is thrust against the abutment portion of said support member and the third engagement portion is engaged with the fourth engagement portion when said pallet is located at the second position.

3. A pallet exchange apparatus according to claim 1, wherein said arm assembly comprises an arm portion and two pallet holding members attached to both ends of said arm portion, said pallets being fitted in and supported by said pallet holding members.

4. A pallet exchange apparatus according to claim 1, wherein said moving device comprises a cylinder mounted on said turntable and having a piston movable in the vertical direction and a plate attached to an upper end of said piston to be engagable with the bottom surface of said pallet located at the workpiece machining station.

5. A pallet exchange apparatus according to claim 1, wherein said driving means for rotating said arm assembly comprises a driving motor and a reduction gear device both mounted on said bed.

6. A pallet exchange apparatus according to claim 5, said reduction gear device has a rotatable cylindrical casing as an output member, and said arm assembly is provided with a center opening at its rotational center and is attached to said casing such a way that said reduction gear device is located in said center opening.

* * * * *